L. Marble,

Making Baskets.

№ 24,699. Patented July 5, 1859.

Witnesses:
D. G. Wilder
N. Edmunds

Inventor:
Lawing Marble ic
UNITED STATES PATENT OFFICE.

LANSING MARBLE, OF VASSAR, MICHIGAN, ASSIGNOR TO HIMSELF AND TOWNSEND NORTH, OF SAME PLACE.

METHOD OF MANUFACTURING BASKETS.

Specification of Letters Patent No. 24,699, dated July 5, 1859.

*To all whom it may concern:*

Be it known that I, LANSING MARBLE, of Vassar, in the county of Tuscola and State of Michigan, have invented a new and Improved Method of Manufacturing Baskets; and I do hereby declare that the following is a full, clear, and exact description of the same, reference being had to the accompanying drawings, making a part of this specification, in which—

Figure 1:
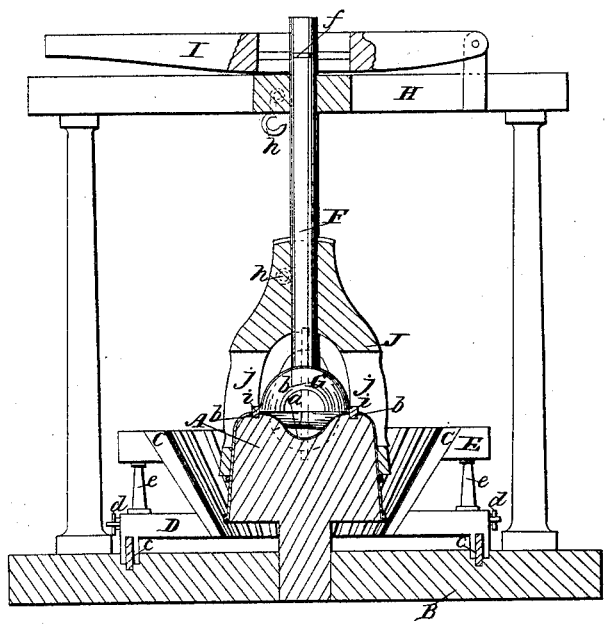
Figure 2:
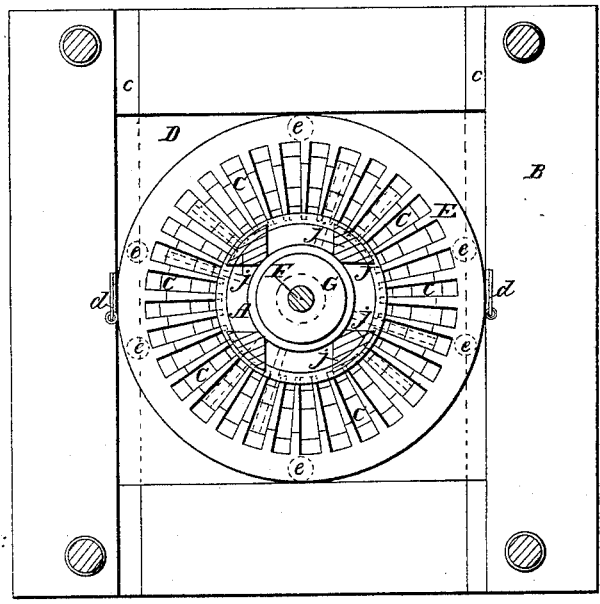

Figure 1, represents a vertical central section of a machine which I use for making my baskets. Fig. 2, is a horizontal section of ditto.

Similar letters of reference in the two views indicate corresponding parts.

This invention consists in forming baskets out of a series of staves or splints which are pressed over a suitable mold and fastened together by more or less hoops, and the mold is so arranged that the bottom of the basket is raised so that the same is less liable to decay by coming in contact with the damp ground, and the staves or splints are arranged on the mold in the proper number and in the required order by a series of guides which can be removed in order to fasten the hoops.

To enable those skilled in the art to make and use my invention I will proceed to describe it.

The mold A is attached to a suitable bed plate B, or it may be firmly secured on the ground or on the floor of a room, and is constructed of wood or metal in the shape of the basket. If made of wood it is provided with metal rings let into the wood at those places where the hoops are to come on the basket in order to clench the nails with which the hoops are secured, which object, of course, is obtained without any further addition if the mold is constructed of metal. The upper surface of this mold is turned in, so as to form a recess $a$, and a pin $b$ is firmly secured right in the center of the mold, and a groove $b'$ is turned in its upper surface and near to the edge, which is to receive the inner bottom hoop of the basket. The mold is surrounded by a series of guides C which are secured with their lower ends to a separate platform D, which slides in grooves, $c$, in the bed plate B, and this platform divides in the center in two halves, which are united by hooks and eyes $d$, and the number of these guides correspond with the number of staves or splints to be used for one basket. The upper ends of these guides are secured to a ring E, which rests on standards $e$, which are rigidly attached to the platform D, and this ring separates in the same manner as the platform. The diameter of this ring is equal to the length of the staves or splints, and the guides as well as the mold have to be changed for different sized baskets.

Right over the center of the mold A, and arranged on a vertical arbor F is a piston G, the lower face of which corresponds in shape to the recess $a$, due allowance being made for the thickness of the several staves or splints which cross each other in the center. The arbor F is guided in a horizontal beam H which represents some part of the building, or which is secured to the sides of the building at the proper height, and the piston is operated by means of a lever I, which is hinged to the beam H, or to some other suitable part of the building, and which acts on the arbor, F, by means of a bar $f$ which is secured at the proper spot near to the upper end of the arbor.

Guided by the arbor F, on which it slides easily up and down, is the outside form J, which fits nicely over the mold A, and which serves to press the several staves or splints together with the middle hoop over the mold, and its inner edge forms a recess $i$ which retains the outer bottom hoop, and, if not used, this form is suspended from the beam H by means of a hook $h$ and eye $h'$. The shell of the form J is perforated with openings $j$, so that access can be had for the purpose of fastening the bottom hoops to the splints or staves.

The operation is as follows:—The staves or splints are sawed, riven or cut from bolts or planks and shaped by turning the edges with a knife of the required shape and length, or by any suitable hand tools, and a hole is made in the center of each stave so that the same may be passed over the central pin $b$ in the mold A. The form J is now raised, the inner bottom hoop is placed in the groove $b'$ in the mold, and the staves or splints are passed through the spaces left between the guides C, one at right angles to the other, and placed over the mold A, and on the pin $b$, and the middle hoop is placed in the proper position on the staves, and the piston G is now depressed so that the staves are forced into the recess $a$, and while retained in this position by the piston the form J is depressed. By the action of this form the staves or splints are bent over the mold A in the proper order as arranged by the guides C, and the middle hoop is forced down over the staves, so that the same can be fastened to its proper place by nails which are clenched by being driven against the metal surface of the mold A, or of the metal rings let into the mold if it is made of wood, and during this operation the guides C are removed, and a few nails are also driven in the bottom hoops, so that the basket retains its proper form, when the form J is raised, and the basket is taken off in order to fasten the top hoops and the handles, and after putting a rivet through the hoop in the center of the basket, and when the bottom hoops have been properly fastened all around, the basket is ready.

Baskets made on this plan have the great advantage of being quite as strong as baskets with plank or board bottoms, and at the same time the staves are not so liable to rot out at the bottom as the conical form of the same, and its openness gives a free circulation to the air, so that all dampness dries out without injury to the wood work of the basket.

What I claim as new and desire to secure by Letters Patent is:—

The within described method of forming baskets by passing a series of staves or splints through proper guides over a mold, and pressing the same in the proper shape by a suitable piston and form, substantially in the manner herein set forth.

LANSING MARBLE.

Witnesses:
D. G. WILDER,
N. EDMUNDS.